June 23, 1925.  1,543,336

F. M. McINTIRE

ANTIKICKING DEVICE

Filed July 2, 1924

Inventor
Francis M. McIntire.

By Clarence A. O'Brien
Attorney

Patented June 23, 1925.

1,543,336

UNITED STATES PATENT OFFICE.

FRANCIS M. McINTIRE, OF MULLIKIN, MICHIGAN.

ANTIKICKING DEVICE.

Application filed July 2, 1924. Serial No. 723,760.

*To all whom it may concern:*

Be it known that I, FRANCIS M. MCINTIRE, a citizen of the United States, residing at Mullikin, in the county of Eaton and State of Michigan, have invented certain new and useful Improvements in an Antikicking Device, of which the following is a specification.

This invention relates to new and useful improvements in anti-kicking devices for animals and is more particularly adapted to a means for preventing a horse from kicking or otherwise unnecessarily exercising its limbs while in a stall.

Another important object of the invention is to provide an anti-kicking device of the above mentioned character, which may be readily and easily placed in position on the limbs of an animal and is further of such a construction as to permit the animal wearing the same to walk as well as to lie down when the device is attached, without causing any discomfort to the animal.

A further object is to provide a device of the above mentioned character, wherein the limb encircling portions of the device are padded so as to prevent the limbs of animal becoming chafed or sore.

Another important object of the invention is to provide an anti-kicking device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 2:
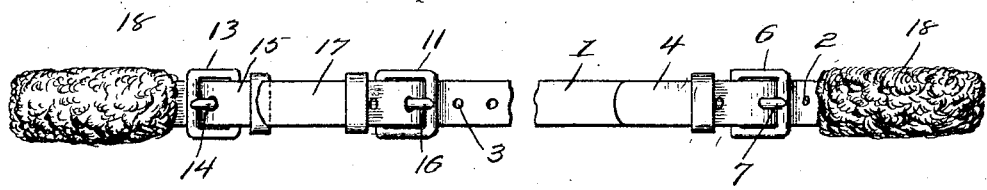
Figure 2 is a side elevation of improved invention.
Figure 3:
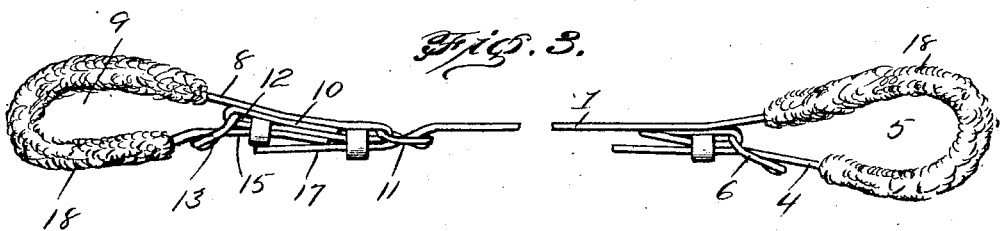
Figure 3 is a top plan view thereof.

In the drawing wherein for the purpose of illustration is shown the preferred embodiment of my invention, the numeral 1 designates an elongated strap formed preferably of leather and the ends thereof are provided with spaced apertures such as shown at 2 and 3 respectively in the drawing. One of the ends 4 of the strap 1 is bent back upon itself to provide the loop 5 which provides a means for permitting the strap to be attached to one of the limbs of the animal, a buckle such as illustrated at 6 is secured to the strap 1 adjacent the end 4 thereof for receiving the free end 4 and the tongue 7 of the buckle 6 is adapted to pass through one of the openings 2 provided in the free end 4 of the strap 1 in the manner clearly illustrated in Figures 2 and 3 of the drawing.

An auxiliary strap such as is illustrated at 8 is looped intermediate its ends to provide the looped portion 9 which encircles one of the front legs or limbs of the animal. One of the ends of the auxiliary strap 8 is bent back upon itself as illustrated at 10 and is stitched to the strap A and provides a means for supporting the buckle 11. The bent back portion 10 is also provided with a loop 12 to provide a means for supporting 13 and the tongue of the buckle 13 passes through one of the openings 14 provided in the free end 15 of the auxiliary strap 8 in the manner clearly illustrated in Figure 3.

The free end of the elongated strap 1 is adapted to extend to the buckle 11 and the tongue 16 thereof passes through one of the openings 3 provided in the free end 17 of the strap 1. This construction is also clearly illustrated in Figures 2 and 3.

Each of the looped portions is covered with a protecting member 18 which is of any soft and suitable material such as lambskin or the like, and I do not wish to limit myself to any particular kind of material to be used. The purpose thereof is to provide a means for preventing the chafing and soreness of the animal's limbs and will prevent the leather straps from coming in contact with the legs or limbs of the animal.

Figure 1:
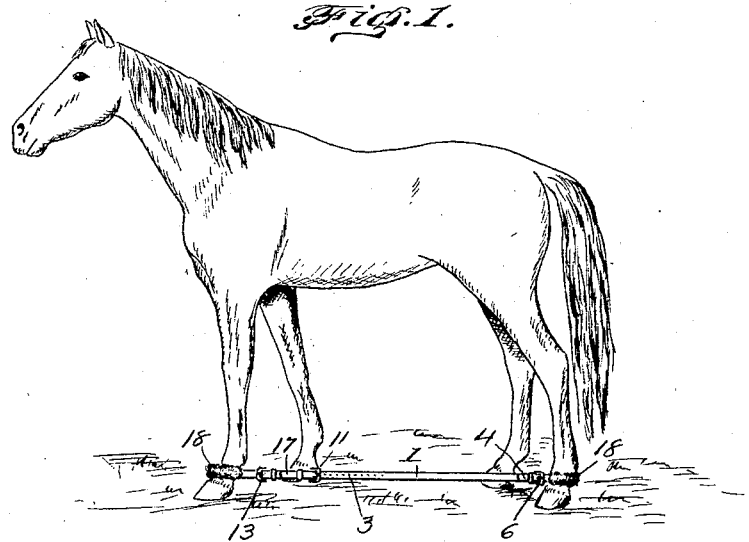
Figure 1 is a view illustrating the manner in which the anti-kicking device is attached to the limbs of an animal.

The anti-kicking device is attached to the legs or limbs of the animal in the manner clearly set forth in Figure 1 and when in use will prevent the animal from accidentally kicking against the stall in which the animal is placed but the device is so constructed and so attached to the limbs of the animal as to permit the animal to readily and easily walk around or lie down. The parts of my improved anti-kicking device are further so arranged as to enable the same to be readily and easily adjustable and the device may furthermore be detached from the limbs of the animal without any difficulty.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

An anti-kicking device comprising an elongated strap having one end thereof bent back upon itself to provide a limb encircling loop, a buckle secured to said strap adjacent the looped portion and engaging the end of the looped portion, an auxiliary strap looped intermediate its end to provide an additional limb encircling loop, one of the ends of said auxiliary strap being bent back upon itself to provide a loop to receive a buckle, the bent back end of the auxiliary strap being again bent back upon itself and secured to the auxiliary strap to provide an additional loop for receiving an additional buckle, the last mentioned buckle adapted for engagement with the opposite end of the auxiliary strap, and the aforementioned buckle of the auxiliary strap being adapted for engagement with the free end of the first mentioned strap.

In testimony whereof I affix my signature.

FRANCIS M. McINTIRE.